United States Patent [19]

Yoshida et al.

[11] 4,121,457
[45] Oct. 24, 1978

[54] LIQUID SENSOR

[75] Inventors: Shuzo Yoshida, Chiryu; Sigeyuki Akita, Aichi; Sotoo Kitamura, Nishio, all of Japan

[73] Assignee: Nippon Soken, Inc., Nishio, Japan

[21] Appl. No.: 795,909

[22] Filed: May 11, 1977

[30] Foreign Application Priority Data

Jun. 25, 1976 [JP] Japan .................................. 51/84274

[51] Int. Cl.² ...................... G01F 23/00; G08B 21/00
[52] U.S. Cl. ........................................ 73/291; 340/604
[58] Field of Search ..................... 73/291, 293, 304 R, 73/308, 313, 304 C; 250/577; 340/59, 235, 244 R

[56] References Cited

U.S. PATENT DOCUMENTS

| | | | |
|---|---|---|---|
| 2,295,927 | 9/1942 | Botteron | 340/235 |
| 2,868,015 | 1/1959 | Haropulos | 73/304 C |
| 2,938,383 | 5/1960 | Blackburn | 73/304 R X |
| 3,242,473 | 3/1966 | Shivers, Jr. et al. | 340/235 X |
| 3,918,035 | 11/1975 | Eshraghian | 73/308 X |
| 3,950,740 | 4/1976 | Greene | 340/244 C |

*Primary Examiner*—Charles A. Ruehl
*Attorney, Agent, or Firm*—Cushman, Darby & Cushman

[57] ABSTRACT

A liquid sensor for sensing a level of liquid contained in a tank as well as the presence or absence of water remaining at the bottom of the tank is disclosed. The liquid sensor comprises a housing mounted at the bottom of the tank, a liquid level detecting element mounted on the housing, a pair of electrodes arranged at the bottom of the tank to detect water remaining at the bottom of the tank and an indicator operated in response to signals developed by the liquid level detecting element and the pair of electrodes.

10 Claims, 6 Drawing Figures

LIQUID SENSOR

BACKGROUND OF THE INVENTION

1. Field of the Invention

The present invention relates to a liquid sensor for sensing a level of oil contained in an oil tank and water remaining at the bottom of the oil tank.

2. Description of the Prior Art

Heretofore, an apparatus for sensing the level of in a tank fuel has been known in which a permanent magnet is arranged in a float which moves up or down with the change of level of the fuel to actuate a reed switch arranged at a stationary location to provide an indication of the level of the fuel. In such an apparatus, however, when water flows into a fuel tank, the water remains at the bottom of the fuel tank because the specific gravity of the water is higher than that of the liquid fuel. This water causes corrosion of the fuel tank or the introduction of water to a carburetor resulting in serious problem affecting the operation of a car. The prior art apparatus could not detect the presence of such water which caused this serious problem.

SUMMARY OF THE INVENTION

It is an object of the present invention to provide a liquid sensor which overcomes the drawback encountered with prior art apparatus.

It is another object of the present invention to provide a liquid sensor which precisely detects a remaining amount of the liquid in a tank and senses water remaining at the bottom of the tank to effectively prevent the corrosion of the tank.

It is a further object of the present invention provide a liquid sensor having a plurality of liquid level detecting elements and sensing circuits arranged on a housing mounted at the bottom of the tank.

It is still other object of the present invention to provide a liquid sensor including a unit for detecting the amount of water remaining at the bottom of the tank, the sensor having a pair of electrodes to detect the presence or absence of the water.

It is a further object of the present invention to provide a liquid sensor including a unit for detecting the amount of water remaining at the bottom of the tank which unit can be arranged at any position at the bottom of the tank.

DESCRIPTION OF THE PREFERRED EMBODIMENT

Figure 1:
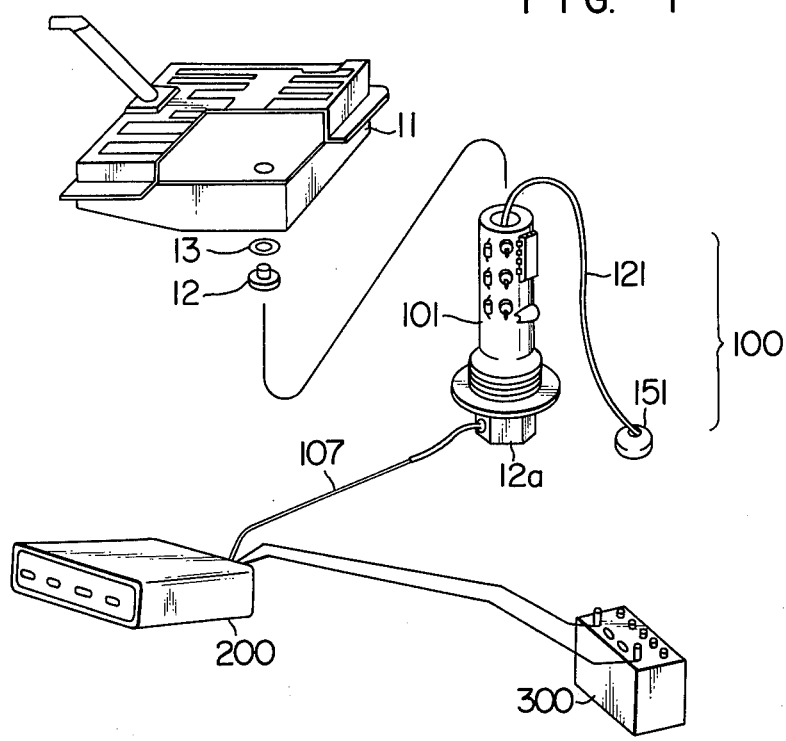
FIG. 1 shows an overall configuration of one embodiment of the present apparatus.

The present invention will now be described in conjunction with a preferred embodiment shown in the drawings. FIG. 1 shows an overall configuration illustrating wiring and the manner of mounting a fuel sensor having a unit for detecting water in accordance with the present invention. In FIG. 1, numeral 11 denotes a fuel tank of a car, 12 denotes a conventional tank plug mounted at the bottom of the fuel tank 11 for draining purposes, 13 denotes a gasket, and 100 denotes a liquid sensor according to the present invention having a function of detecting water, the sensor having electronic components mounted on a peripheral wall of a hollow, cylindrical housing 101, which is fixed to a plug base 12a which is a modification of the conventional tank plug 12. The entire assembly is mounted at the bottom of the fuel tank 11. Numeral 151 denotes a water sensing electrode, and 121 denotes a lead connecting the housing 101 with the electrode 151. Numeral 200 denotes an indicator unit which may be mounted at a portion of a control panel within a car. Numeral 300 denotes a battery which supplies power to drive an electronic circuit.

Figure 2:
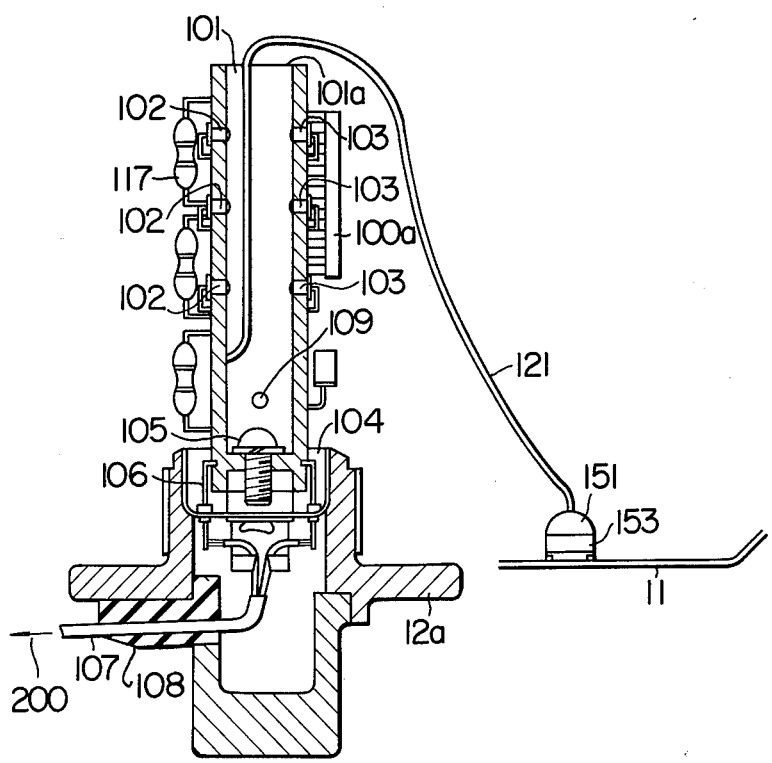
FIG. 2 shows a sectional view of a sensor unit employed in the described embodiment of the present invention.

FIG. 2 shows the construction of the sensor 100 having a water detection function. In FIG. 2, numerals 102 denote light emitting diodes which are arranged at three points spaced axially within the housing 101, and numerals 103 denote photo-transistors serving as light sensing elements which are arranged opposite to the respective light emitting diodes 102 on the optical axes thereof. The housing 101 is provided with a port 101a and a bore 109 so that liquid can be introduced into the housing 101. Numeral 117 denotes a resistor, one being connected to each of the light emitting diodes 102, as can better be appreciated by reference to FIG. 4 and the description thereof hereinafter presented. The housing 101 is clamped by a bolt 105 to a cap 104 fixed to the plug base 12a. Numeral 106 denotes a hermetically sealed electrode arrangement for carrying signals detected by the photo-transistors 103 through amplifying stages, 107 denotes leads for feeding the detected signals to the indicator 200, and 108 denotes a rubber bushing for supporting the leads 107. Numeral 151 denotes a water detection electrode which is fixed at the bottom of the fuel tank 11 by the magnetic attractive force of a magnetic member 153. Numeral 121 denotes a lead for connecting the housing 101 to the electrode 151. Numeral 100a denotes major circuit components of a sensor circuit 100A (detailed in FIG. 4) mounted on the housing 101. The housing 101 is made of a well-known flexible electric circuit panel board, for example.

Figure 3A:
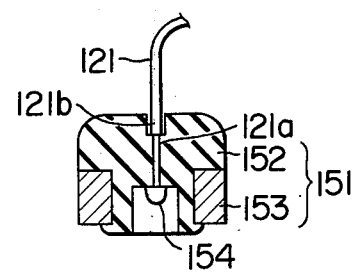
FIGS. 3 (A) and (B) show a sectional view and a plan view, respectively, of electrodes of the sensor illustrated in FIG. 2.
Figure 3B:
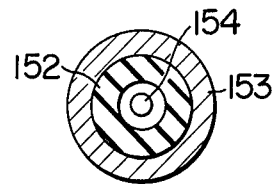

FIGS. 3 (A) and (B) show the detailed structure of the electrode 151, which incorporates a ferrite magnet 153 in an insulating housing 152 for the electrode. The electrode may be an iron wire 121a of the lead 121, which iron wire is threaded through the housing 152 with one end thereof being fixed by solder 154 within a recess of the housing 152. The lead 121 is clamped by the solder 154 and an insulative cover 121b of the wire so that it does not move in either direction. The electrode 151 is arbitrarily positioned on the bottom of the tank 11.

Figure 4:
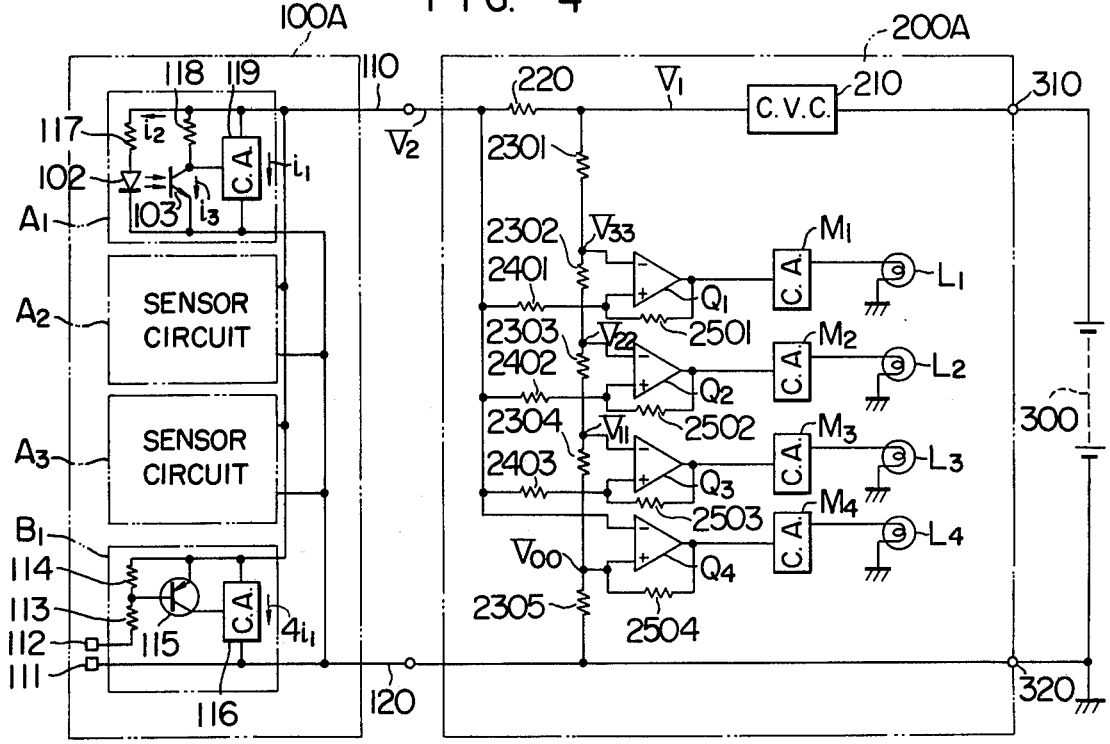
FIG. 4 is an electrical schematic diagram of the sensor according to the present invention.

FIG. 4 shows an example of an electrical wiring diagram of the fuel sensor having a water detection function. Numeral 100A denotes a sensor circuit of the fuel sensor, which is mounted on the housing 101. Numeral 200A denotes an indicator circuit packaged into the indicator unit 200. The sensor circuit 100A and the indicator circuit 200A are interconnected by a signal line 110 and a ground line 120 which are represented by the leads 107 in FIGS. 1 and 2. In the sensor circuit 100A, sensor circuit sections $A_1$ through $A_3$ are of the same construction each comprising the light emitting diode 102, the photo-transistor 103, a forward resistor 117 to limit a flow-in current of the light emitting diode 102, the collector resistor 118 and a current amplifier (C.A.) 119 including transistors. Numeral 111 denotes a ground electrode which utilizes the ground potential of the fuel tank 11 and 112 denotes a plus (+) electrode for detecting water in cooperation with the ground electrode 111. The electrode 112 utilizes the iron wire 121a of the lead 121 in FIG. 3. While the plus (+) electrode 112 is provided in an electrode unit 151 which is external of the housing in the illustrated embodiment, the plus (+) electrode and the ground electrode 111 alternatively may be arranged at the bottom of or beneath the housing 101. A sensor circuit $B_1$ for detecting water comprises a transistor 115, base resistors 113 and 114 for determining a base potential of the transistor 115 and a current amplifier circuit (C.A.) 116 including transistors. Numeral 310 denotes a terminal connected to the positive (+) terminal of a battery 300, and 320 denotes a terminal connected to the negative (−) electrode of the battery 300 which is grounded. In an indicator circuit 200A, numeral 210 denotes a constant voltage circuit (C.V.C.) for producing a constant voltage $V_1$, 220 denotes a current sensing resistor, 2301, 2302, 2303, 2304 and 2305 denote voltage dividing resistors for dividing the constant voltage $V_1$ to produce reference voltages $V_{00}$, $V_{11}$, $V_{22}$ and $V_{33}$. Numerals 2401, 2402 and 2403 denote protecting resistors for preventing offset, 2501, 2502, 2503 and 2504 denote feedback resistors, $Q_1$, $Q_2$, $Q_3$ and $Q_4$ denote comparators, $M_1$, $M_2$, $M_3$ and $M_4$ denote current amplifiers (C.A.), and $L_1$, $L_2$, $L_3$ and $L_4$ denote indication lamps.

The operation of the fuel sensor having the water detecting function now will be explained. In the sensor circuit 100A mounted on the bottom of the fuel tank 11, the liquid fuel normally fills in the spaces between the light emitting diodes 102 and the photo-transistors 103. The light emitted from the light emitting diodes 102 is scattered by the liquid and not transmitted to the photo-transistors 103 so that the photo-transistors 103 remain nonconductive. Under such a condition, the current amplifier stages 119 are driven, a total current of $3 \times i_1$ is taken out of the three current amplifier circuits 119, where $i_1$ is an output current of each of the current amplifier circuits 119. A total current flowing in the three light emitting diodes 102 is $3 \times i_2$, where $i_2$ is a current flowing through each of the light emitting diodes 102, assuming that $i_2 >> i_3$, where $i_3$ is a current flowing in each of the photo-transistors 103 when they remain conductive. Thus, a current of $i_0 = 3 \times i_2$ is normally flowing. A sum current of $3 \times i_1 + i_0$ produces a voltage drop of $(3 \times i_1 + i_0) \times R$ across the current sensing resistor 220 having a resistance R, in the indicator circuit 200A. Thus, a voltage $V_2$ on the signal line 110 exhibits an output voltage of $V_1 - (3 \times i_1 + i_0) \times R$. Under this condition, if water remains at the bottom of the fuel tank, the electrodes 111 and 112 are electrically connected to render the transistor 115 conductive. Accordingly, the current amplifier 116 is driven. The current amplifier 116 is designed to allow the electric current $4 \times i_1$ to flow therethrough in response to the conduction of the transistor 115. Thus, the voltage $V_2$ on the signal line 110 changes to $V_1 - (3 \times i_1 + i_0) \times R - 4 \times i_1 \times R = V_1 - (7 \times i_1 + i_0)R$. As the fuel gradually decreases until the liquid level drops below the first light emitting diode 102 and the first photo-transistor 103, the first photo-transistor 103 receives light from the first light emitting diode 102 so that the first photo-transistor 103 conducts. As the fuel level further drops, the second and third photo-transistors 103 sequentially conduct. When the photo-transistors 103 conduct, the succeeding current amplifier stages 119 are inhibited as opposed to the previous case so that the output current $i_1$ of each of the current amplifier stages 119 is zero. Since the design is such that $i_1 >> i_3$, the voltage $V_2$ on the signal line 110 rises by $i_1 \times R$ from the previous state. Thus, the voltage $V_2$ on the signal line 110 when the presence of water is detected is expressed by level "0" when all of the three current amplifier stages 119 are conductive, level "1" when two of the current amplifier stages 119 are conductive, level "2" when one of the current amplifier stages 119 is conductive, and level "3" when none of the three current amplifier stages 119 is conductive. These conditions are classified in the following table and are schematically illustrated in FIG. 5.

| Condition | Voltage $V_2$ No water detected | Water detected |
|---|---|---|
| Level "0" | $V_2 = V_1 - (3i_1 + i_0)R$ | $V_2 = V_1 - (7i_1 + i_0)R$ |
| Level "1" | $V_2 = V_1 - (2i_1 + i_0)R$ | $V_2 = V_1 - (6i_1 + i_0)R$ |
| Level "2" | $V_2 = V_1 - (i_1 + i_0)R$ | $V_2 = V_1 - (5i_1 + i_0)R$ |
| Level "3" | $V_2 = V_1 - i_0R$ | $V_2 = V_1 - (4i_1 + i_0)R$ |

Figure 5:
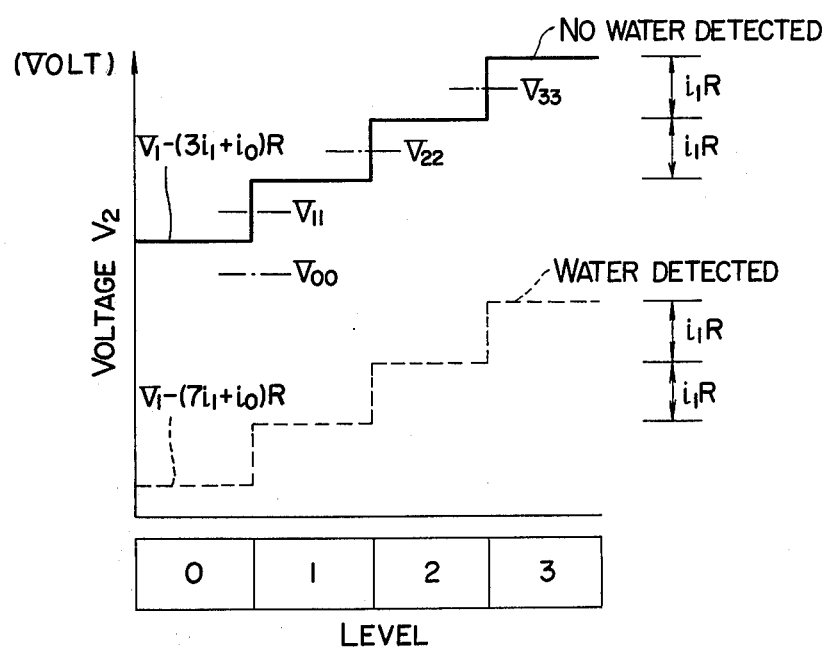
FIG. 5 is a voltage characteristic chart for explaining voltage changes experienced on a signal line from the sensor unit.

Now, the reference voltages derived by the dividing resistors 2301, 2302, 2303, 2304 and 2305 are selected to midpoint voltages $V_{00}$, $V_{11}$, $V_{22}$ and $V_{33}$ of the voltage increments of the stepping output voltage shown in FIG. 5, and those voltages are applied as reference input voltages to the comparators $Q_4$, $Q_3$, $Q_2$ and $Q_1$. Accordingly the output of the comparator $Q_4$ is reversed from low level to high level when the presence of water is detected, no matter where the level of the liquid fuel is. This reversed output drives the current amplifier $M_4$, which in turn causes the indicator lamp $L_4$ to turn on. When the fuel liquid gradually decreases, the outputs of the comparator $Q_3$, $Q_2$ and $Q_1$ are sequentially reversed from low level to high level in this order and the reversed outputs sequentially drive the current amplifiers $M_3$, $M_2$ and $M_1$ in this order to turn on the indication lamps $L_3$, $L_2$ and $L_1$ in this order. In this manner, as the level of the fuel liquid changes, the indication lamps $L_3$, $L_2$ and $L_1$ are lit sequentially so that the level of the liquid fuel is indicated. The presence of water in the fuel is indicated by the indication lamp $L_4$.

While the photo-sensors are used to detect the level of the liquid fuel in the above described embodiment, any other means such as floats which operate to actuate reed switches, or thermistors whose resistance changes are detected may be used. Also, any number of such sensor assemblies may be used.

Furthermore, while the above embodiment relates to detection of fuel in a fuel tank and water remaining at the bottom of the fuel tank, it should be understood that the present invention can be applied to detect the amount of any liquid having a lower specific gravity than water, for example, oil in the presence of water.

While the tank 11 has been shown as being of a conductive, magnetic, metallic material in the above embodiment, a tank of non-conductive and non-magnetic material such as resin may be used, in which case a ground electrode must be additionally provided to the electrode 151.

We claim:

1. An apparatus for sensing the level of a liquid having a specific gravity lower than that of water and for sensing the presence or absence of water lying under said liquid comprising:
   a container for containing said liquid having a specific gravity lower than that of water;
   a level sensor, provided in said container, for generating a first signal which changes as the level of said liquid changes;
   a water sensor having a pair of electrodes spaced from each other and provided at the lowermost portion of said container, for generating a second signal when a current flows between said electrodes through water lying under said liquid;
   a signal transmitting wire commonly connected to said level sensor and said electrodes, for superposing said second signal on said first signal to produce a superposition signal therein;
   a first comparator, provided outside said container and connected to said signal transmitting wire, for generating a first indication signal when the magnitude of said superposition signal changes across a first reference magnitude preset to detect the magnitude change of said first signal;
   a second comparator, provided outside said container and connected to said signal transmitting wire, for generating a second indication signal when the magnitude of said superposition signal changes across a second reference magnitude preset to detect the magnitude change of said signal; and
   an indicator unit, connected to said first and second comparators, for indicating the level of said liquid and the presence or absence of water lying under said liquid in response to said first and second indication signals.

2. An apparatus according to claim 1, wherein said container has a magnetic material, and wherein at least one of said pair of electrodes is provided with a magnet which is magnetically coupled with said magnetic material.

3. An apparatus according to claim 1, wherein said container has a grounded conductive material which constitutes one of said pair of electrodes, and wherein the other of said pair of electrodes is connected to said signal transmitting wire.

4. An apparatus according to claim 3, wherein said the other of said pair of electrodes is connected to said signal transmitting wire via a conductive wire, whereby said the other of said pair of electrodes may be placed apart from said level sensor.

5. An apparatus according to claim 1, wherein said level sensor and said electrodes are adapted to change the current magnitude of said superposition signal transmitted through said signal transmitting wire as said first and second signals change.

6. An apparatus according to claim 5, further comprising:
   a constant voltage source for providing a constant voltage on the output terminal thereof; and
   a resistor, connected in series between said output terminal of said constant voltage source and said signal transmitting wire, for causing a voltage change at said signal transmitting wire in response to change of said current magnitude of said superposition signal.

7. An apparatus according to claim 6, further comprising:
   a plurality of resistors, connected in series and connected across said output terminal of said constant voltage source, for supplying said first and second comparators with divided first and second voltage potentials respectively, said first and second voltage potentials being equal to said first and second reference levels, respectively.

8. An apparatus according to claim 7, wherein said indication unit includes:
   a first indicator, connected to said first comparator, for indicating the level of said liquid in response to said first indication signal; and
   a second indicator, connected to said second comparator, for indicating the presence or absence of water lying under said liquid in response to said second indication signal.

9. An apparatus according to claim 1, further comprising:
   plug means fixed to the bottom of said container;
   a cylindrical housing, attached on said plug means, including said level sensor mounted thereon.

10. An apparatus according to claim 9, wherein said level sensor includes at least a pair of a light emitting diode and a photo-transistor mounted in face to face relation, respectively, on the inner surface of said cylindrical housing along the longitudinal axis of said housing.

* * * * *